E. CRANE.
Device for Scarifying the Soil Preparatory to Plowing.
No. 76,404. Patented April 7, 1868.
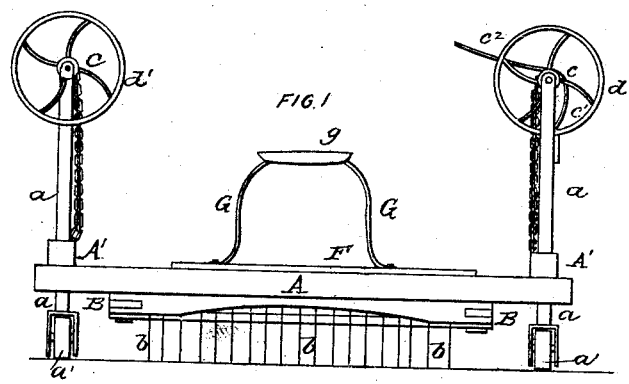
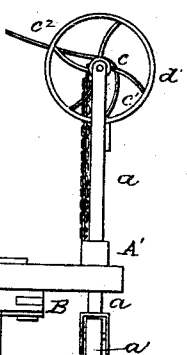
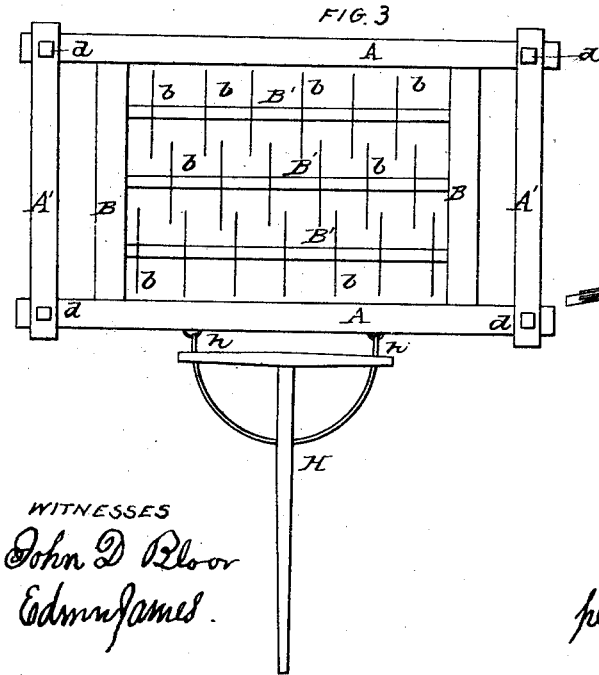
WITNESSES
John D. Bloor
Edm. James
INVENTOR
Elisha Crane
per Holmead & Hollingshead
Attorney.

United States Patent Office.

ELISHA CRANE, OF ELKHART, ILLINOIS.

*Letters Patent No. 76,404, dated April 7, 1868.*

IMPROVED DEVICE FOR SCARIFYING THE SOIL PREPARATORY TO PLOUGHING.

*The Schedule referred to in these Letters Patent and making part of the same.*

TO ALL WHOM IT MAY CONCERN:

Be it known that I, ELISHA CRANE, of Elkhart city, county of Logan, State of Illinois, have invented certain new and useful Improvements in Devices for Scarifying the Soil Preparatory to Ploughing; and I hereby declare that the following is a full, clear, and exact description of the same, reference being had to the accompanying drawings, and to the letters of reference marked thereon, making a part of this specification, in which—

Figure 1 is an end view.
Figure 2 is a side view.
Figure 3 is a plan view.

My present invention is an improvement on a patent granted me on the 28th day of January, 1868, the object of which was, by scarifying the soil by a series of cutters, which worked so as to leave the soil cut in parallel grooves, that the difficulty and almost impossibility of ploughing the prairie soils of the West was greatly removed if not entirely obviated. As stated in my former patent, in consequence of the matted soil produced by the long grass of the prairie, it was impossible for an ordinary plough to so cut and reduce the same to lumps, that the soil so broken could be advantageously planted during the first season; the plough so turning the soil as to leave over the seed, when planted, a soil so thick that the seed was entirely removed and excluded from such action of heat and moisture as was not only necessary, but indeed absolutely indispensable, to the growth in such a manner as to insure the desired maturity of the same. As it is well known that the prairie soil is ordinarily of a depth of six inches, the grass, of course, having so deep a root, possesses remarkable vitality. Therefore, when the same is turned in sheets, the grass still having so deep a root in the turned sod, that during the first season it is not so killed or its vitality destroyed as to render the prairie properly accessible to the ordinary influences of cultivation.

The nature of my former invention consisted in attaching to a suitable frame, by means of slotted shanks, a series or gang of cutting-disks, so arranged that they would cut the sod in parallel lines, and of a depth sufficient to render the subsequent task of properly ploughing, both simple and easy.

Practical experience has fully demonstrated the entire utility of my invention, as described and claimed, and therefore the object of my present improvement is only to simplify the principles involved, and clearly stated therein, whereby the necessary friction incident upon the former construction of my machine is not only greatly reduced, but the expense of the same diminished fully one-half.

In an ordinary truck-frame, I insert a series of three or more rods, the same being parallel to each other. These rods may be of any desired form or shape, but I prefer to make them square, as the cutting-disks or blades thereby can be much more readily and firmly attached thereto. Over this truck-frame, resting on suitable bearings, I place a platform which supports the driver's seat. Through the ends of these bearings I pass four rods, to the ends of which are attached suitable casters or wheels. In the upper ends of these rods I attach windlass-rollers, which are connected to cross-beams by suitable chains, whereby the depth of the cutting-disks can readily be regulated, and for the means of transportation, the same can be so elevated as to be entirely free from the soil.

To enable others skilled in the art to make and use my invention, I will now proceed to describe its construction and operation.

A A is an ordinary frame, the end beams A' of which are firmly connected thereto by means of bolts, or other suitable attachments. To the long beams A A of this frame I firmly attach a truck-frame, B B. To this truck-frame I firmly attach, by means of metallic sockets, plates, or other suitable bearings, a series of parallel rods, B' B'. These rods may be of cast iron, or made of other suitable material, and may be of any desired number. I have shown in the present instance a series of three. These rods I usually form square, as thereby the cutting-disks of blades can be much more readily attached to the same, as the tendency to slip or slide is greatly reduced when the disks or blades are formed with square openings and have their bearings on square rods. But it will readily occur to any one skilled in the art that the form or shape of the rod could readily be changed without in the least degree affecting the principles of my invention. To these rods, I attach, at suitable intervals, a series of cutting-blades or disks, *b b*. These disks *b b* ought to be made of steel, so that a sharp cutting-edge can always be obtained. These disks are so arranged that they can in no manner clash with each other, whereby the "choking" of the machine is guarded against. But at the same time they are so arranged, that in operation they will perfectly scarify the soil, leaving the same cut in parallel grooves, say from two and a half to three inches from each other. In the ends of the frame A A A' A', I form four square openings $d\,d$. Through these openings pass four adjustable uprights, $a\,a$. These uprights may be made of wood, or may be made to fit in suitable metallic sockets. In the lower end of these uprights $a\,a$, I firmly attach, in proper sockets, bearings, casters, or wheels, $a'\,a'$. In the upper end of the uprights $a\,a$, one at each end of the machine, are firmly secured windlass-rollers, $c\,c$. On the end of the windlass-rollers are secured metallic sleeves, D D. To the inner end of these sleeves is firmly attached a winding-wheel, $d'$, by which the windlass-rollers are readily operated. To the inner end of the sleeve, and to a corresponding sleeve attached to the other end of the windlass-roller $c$, are attached elevating or hoisting-chains, E E. These chains are firmly attached at their lower bearings to the cross-beams A' A' by means of hooks or loops, $e^2\,e^2$. From one of these hooks $e^2$, at each end of the machine, there is also secured a brace-chain, $e$, which has its upper bearing in the opposite upright, $a$, in a metallic loop or stud, $e^1$. To the outer end of the sleeve D, to which is attached the wheel $d'$, I firmly bolt or secure a ratchet-wheel, $c$. The action of this ratchet-wheel is controlled by a pawl, $c^2$, it being retained in gear by means of a spring-attachment, $c^1$. On the frame A A, I place a platform, F, to which is attached, by means of suitable supports G G, the driver's seat $g$. To the forward end of the frame A A, I attach, by means of ordinary metallic loops or bearings $h\,h$, the tongue or pole H.

Having thus fully described the nature of my invention, I will now proceed to describe its operation: Suppose the machine to be in the barn, and we desire to convey the same to the field where it is to be operated. The wheels $a'\,a'$ are revolved, which of course revolves the windlass-roller $c\,c$, which carry with them the elevating-chains $e^2\,e^2$, which operation is continued until the truck bearing the cutting-disks and axles is entirely freed from the ground; the windlasses being retained at the desired point by means of the ratchet-wheel, spring, and pawl $c\,c^1$ and $c^2$. This leaves the machine free to travel on the casters or wheels $a'\,a'$. After the machine has been conveyed to the desired point, the pawl $c^2$ is released, which causes the uprights $a\,a$ to ascend, bringing the cutting-disks into immediate contact with the ground, whereby they will readily operate, cutting their entire depth; or the same, should not the full depth be required, can be readily regulated by means of the windlass-rollers and chains, substantially as set forth and described.

Having thus fully described the nature of my invention, what I claim therein as new, and desire to secure by Letters Patent, is—

1. The truck-frame B B, where the same is provided with a series of parallel rods or axles, B' B', when the same are provided with a series of cutting-blades or disks, $b\,b$, and the whole is constructed and arranged so as to operate substantially as described, for the purposes specified.

2. The truck B, when the same is in combination with the uprights $a$ and wheels $a'\,a'$, and the whole is so constructed as to operate substantially as described, and for the purposes specified.

3. The truck B, rods or axles B', cutting-blades or disks $b$, when the same is in combination with the windlass-rollers $c\,c$, and its operating-mechanism, and the whole is so constructed and arranged as to operate substantially as described, and for the purpose specified.

4. Arranging above the truck B, when the same is provided with parallel rods or axles B' B', and cutting-blades or disks $b\,b$ of the platform F and driver's seat $g$, when the whole is so constructed and arranged as to operate substantially as described, and for the purposes specified.

In testimony whereof, I have signed my name to this specification in the presence of two subscribing witnesses.

ELISHA CRANE.

Witnesses:
  THOS. ALSOP,
  THEODORE J. SCHNEIDER.